United States Patent
Cease et al.

[15] 3,681,695
[45] Aug. 1, 1972

[54] MULTIPATH COMPENSATION SYSTEM

[72] Inventors: Richard G. Cease, Westwood; William J. Bickford, Weston, both of Mass.

[73] Assignee: Raytheon Company, Lexington, Mass.

[22] Filed: Sept. 2, 1969

[21] Appl. No.: 854,594

[52] U.S. Cl. .................... 325/305, 325/369, 325/476
[51] Int. Cl. ............................................. H04b 1/18
[58] Field of Search ...................... 325/476, 369, 305

[56] References Cited

UNITED STATES PATENTS

| | | | |
|---|---|---|---|
| 3,174,104 | 3/1965 | Easter et al. | 325/369 |
| 2,042,831 | 6/1936 | Crosby | 325/369 X |
| 2,089,409 | 8/1937 | Ohl | 325/369 |
| 2,951,152 | 8/1960 | Sichak et al. | 325/369 X |
| 3,167,761 | 1/1965 | Parquier | 325/476 X |
| 3,471,788 | 10/1969 | Bickford et al. | 325/476 X |
| 3,444,471 | 5/1969 | French | 325/369 X |
| 3,518,680 | 6/1970 | McAuliffe | 325/476 X |
| 3,069,630 | 12/1962 | Adams et al. | 325/305 X |
| 3,348,152 | 10/1967 | Laughlin et al. | 325/305 |
| 3,383,599 | 5/1968 | Miyagi | 325/305 |
| 3,457,512 | 7/1969 | Deman | 325/305 X |

*Primary Examiner*—David L. Trafton
*Attorney*—Harold A. Murphy and Joseph D. Pannone

[57] ABSTRACT

A system for compensating for multipath distortion in a synthetic phase isolator predetection combiner. Since echos in the signal can be detected with respect to both magnitude and sense, this information can be used to suppress echos or to control time delay compensation elements to thereby provide a more coherent output signal. Multipath distorted signals are received at a plurality of channels, each of which channels effectively shifts the input signal phase by predetection combination with the sum of the signal outputs of the other channels such that each channel output is substantially independent of the input signal phase.

7 Claims, 1 Drawing Figure

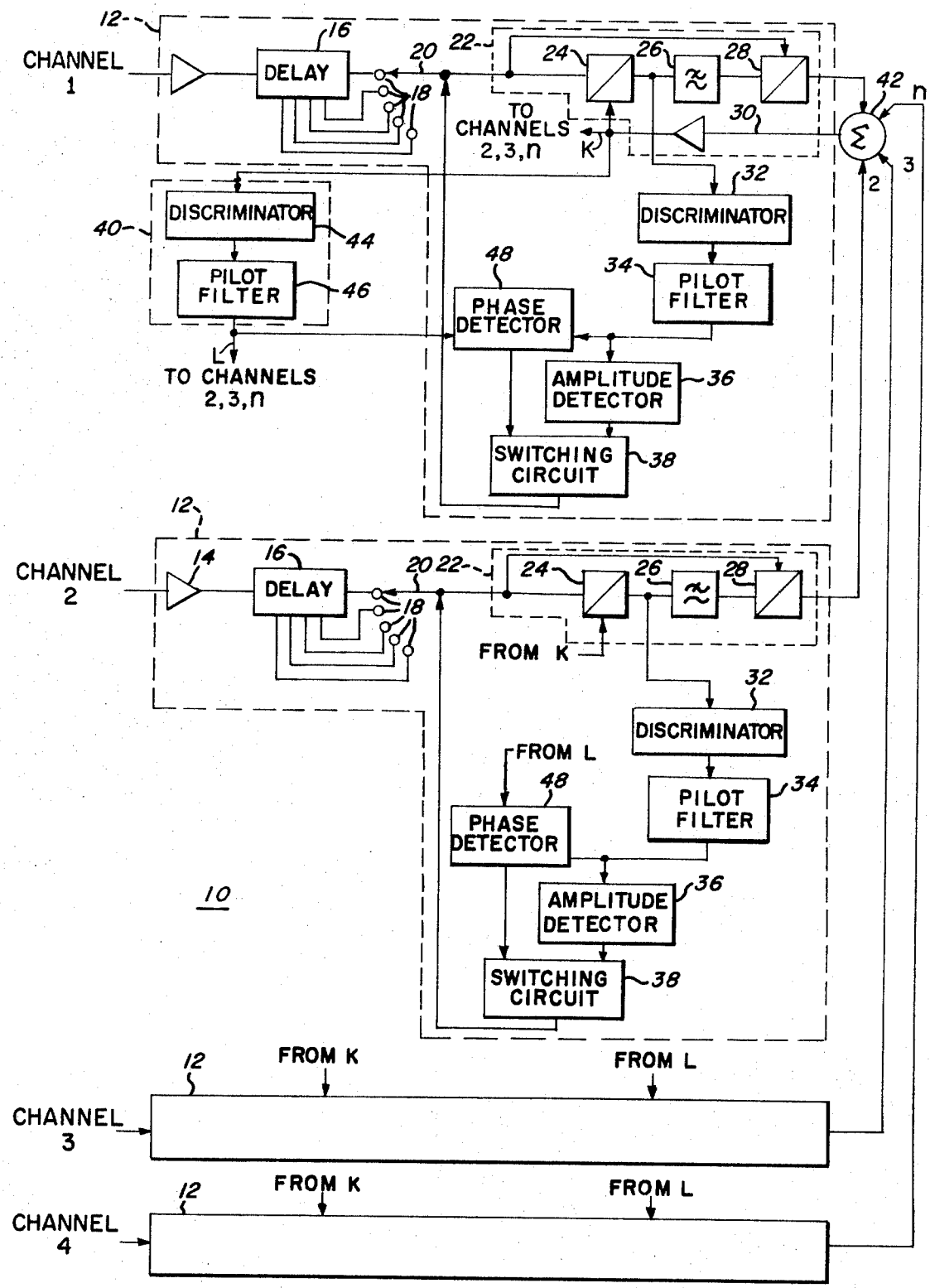

MULTIPATH COMPENSATION SYSTEM

BACKGROUND OF THE INVENTION

Application Ser. No. 562,375 (now U.S. Pat. No. 3,471,788) of W. J. Bickford et al. titled "Predetection Signal Processing System" is incorporated herein by reference.

It is frequently desirable to combine signals arriving at two or more points in a manner which provides maximum signal power to a load. However, it is usually difficult to process these signals so as to provide maximum signal power to the load. This is due in part to the fact that phase relationships of the mean frequencies of a given spectrum or the carriers of the incoming signals are generally independent of each other. The addition, therefore, of the two or more of such signals provides an output whose amplitude is dependent upon the vector sum of the incoming signals and results in an output varying as a function of the phase and amplitude relationships of the incoming signals. For example, when signals obtained from each of a plurality of antenna elements are added, the power transfer therefrom depends upon the relative location of each antenna element with respect to the transmitting source. Also, in an antenna array the spacing of elements becomes important, as does the spacing of transducers in an acoustical array. In other instances, the transmission medium may change to bring about undesirable phase differences in the incoming signals to be combined. While under certain conditions phase descrepancies may be corrected to permit maximum signal power transfer to the load, which in some instances may be a diversity receiver, in other cases the transmitting medium and direction of the source may vary in a manner such that phase correction becomes difficult, if not impossible to achieve.

It is therefore desirable to combine separate signals of differing phase to achieve maximum power transfer to a load, irrespective of the phase relationships of the incoming signals. It is also desirable to combine modulated signals from a common source to achieve maximum power output when such signals are received by a plurality of antenna elements. In other instances, it is required that signals from a plurality of antenna elements be combined in an efficient manner when frequency diversity transmission is employed. Finally, it may be desirable to combine in an efficient manner individual signals which contain the same information when received irrespective of the transmission or receiving medium.

In the past it has been customary to provide postdetection combining processes in an effort to achieve the above-recited signal translation functions and at the same time minimize the reception of noise. However, when the predetection signal to noise ratio is such that noise degrades the detection process, postdetection combining, that is combining said signals after detection, no longer yields maximum signal power. Predetection combining can be used to avoid the undesirable results associated with postdetection combining. However, predetection combining requires that the signals to be combined be in phase at any given instant of time and, as a result, is frequently difficult to achieve and requires complex circuitry capable of adjustment to compensate for carrier phase differences. While signals combined by this process provide a more favorable signal to noise ratio at the input to the detection device, the difficulty of adjusting for individual signal phase differences results in complex structure often including a number of phase comparison and feedback control devices. For example, when four signals are to be combined, it is generally necessary to provide at least three degenerative feedback systems to minimize phase differences of three of the incoming signals relative to one of such signals.

In many instances it is desirable to provide an improved signal processing system in which the phase differences associated with a plurality of incoming signals can be compensated or rendered negligible, said signals later being combined to provide an output signal which exhibits the desirable characteristics associated with, and is particularly adapted to predetection combining, such improved signal characteristics including, for example, signal to noise ratio, form factor, and the like.

It is therefore desirable to provide an improved signal processing system in which the phase differences associated with incoming signals are effectively compensated or rendered negligible so as to provide output signals of like phase which are particularly suited for predetection combining and are substantially independent of the phase of the incoming signals. This arrangement may be conveniently termed a synthetic phase isolator or predetection signal processing system. Such a system is described in copending application Ser. No. 562,375 entitled, "Predetection Signal Processing System" filed on July 1, 1966. In accordance with the invention described in the above identified copending application, in order to add signals before detection, often called predetection combining, each of which have the same information content, the relative phase of these signals, as noted, must be substantially zero during the addition process. The relative phase of these predetected signals is made zero by synthesizing or generating for each incoming signal, a synthetic signal having a phase that is equal to but opposite from that of an incoming signal. The heterodyning of each of these synthesized signals with incoming signals produces resultant signals that have the same phase and are therefore isolated from the incoming signals. The synthesized signals are generated by mixing a common signal with each of the incoming signals. The signal processing is termed synthetic phase isolation.

One of the primary aspects of the predetection combiner capability relates to alignment of the RF phases of multi-element receiving systems. When there is a lack of coherence across the information bandwidth the system degrades. In a transmission that results in multipath or echos of considerable time separation, the same signal processing technique provides information that can be used to improve reception. Basically echos are detectable both in magnitude and sense. This information can be used to suppress echos or to control time delay compensation elements. In either case the resultant provides a more coherent signal at the output.

In one sense, the synthetic phase isolator predetection combiner described in Ser. No. 562,375 provides ratio squared combining based on equal thermal noise backgrounds. This provides the maximum signal to noise enhancement possible in a linear diversity combining system. The output is the ratio of the received signals to noise squared and then added. The system to be described here approaches ratio squared combining based on the sum of thermal plus intermodulation effects. As a further benefit, if there is gain instability in receiving elements this configuration tends to remove or cancel these drifts.

Another application of the present invention lies in the area of large antenna arrays. When the information frequencies have periods only slightly longer than dimensions of the array, the system requires time delay compensation in the antenna element paths before combining. The configuration can detect this problem and establish criteria for compensating for the time difference resulting from the angle of arrival.

In HF and troposcatter transmission, often selective fading occurs which is caused by multipath (two or more signals received but with different path lengths — so different that over the signal passband, the signals add at some points and subtract at others). When a diversity system is used and, as in troposcatter, all signals are fading, a system for reception that aligns the signals in phase and adds them before detection (predetection combining) is faced with the problem of correcting for time delay errors as well as phase errors. The synthetic phase isolator technique can be used to correct for phase errors and further, it can detect time delay errors, particularly in FM systems.

SUMMARY OF THE INVENTION

The above objects, advantages and features as well as others are achieved by providing means for receiving input information signals of varying relative phase, means including heterodyning, combining and filtering means serially connected to said receiving means for providing output signals containing said information and with the relative phase of the output signals substantially independent of said input signals, feedback means fed by said output signals including a regenerative loop including means for multiplying said information containing signals with said input signals, and means for controlling any echos accompanying the input information signals to provide a more coherent output signal.

BRIEF DESCRIPTION OF THE DRAWING

The FIGURE is a block diagram of a multipath compensation system embodying the present invention.

DESCRIPTION OF THE PREFERRED EMBODIMENT

In a multichannel predetection combiner such as that disclosed in Ser. No. 562,375, if the feedback signal is in time coincidence with the Channel 1 signal after the first mixer, than there is a pure tone at the difference frequency, determined by the filter. If there is a time difference, there will still be the tone, but the amplitude depends upon the correlation coefficient, $p$. In the first case, the coefficient is 1, neglecting noise, etc. In the second case, it can be quite a bit lower. As a function of modulating frequency, the correlation for low modulation index can be approximated from the time delay $\tau$. This is demonstrated below in equations (1), (2) and (3).

$$f_m \ll 1/\tau, p \rightarrow 1 \qquad (1)$$

$$f_m = 1/3\tau, p = 0 \qquad (2)$$

$$f_m = 1/2\tau, p = -1 \qquad (3)$$

Values beyond $1/2\tau$ are probably not of interest, but the function is periodic. A loose interpretation for the FM signal, with a large number of baseband modulating frequencies, i.e. FDM–FM telecommunications, the correlation coefficient will be near unity for low frequency components and could approach −1 for high frequency components. Thus, starting with a baseband with constant modulation index, the result is:

$$M_{new} = M_{old}[2 \sin \theta/2]$$

$\theta = 2\pi f_a$
$f_a$ = baseband frequency  (4)
$\tau$ = path delay $$M_{out} = 2M_{in} \sin(\pi f_a \tau) \qquad (5)$$

where $f_a$ = baseband frequency, $\tau$ = path delay and $\theta = 2\pi f_a \tau$. Note the change in sense as $f_a$ gets larger, or if $\tau$ is negative. In one case $f_{max}$ ($1/3\tau$) which would mean $M_{out} \rightarrow 1.73 M_{in}$.

Thus, the output signal from the first mixer is an FM signal with a high probability of being above threshold and a modulation index that varies as $\sin(\pi f_a \tau)$. For a fixed $f_A$ or band near $f_{max}$, the output of a discriminator, or other similar means of detection, provides a measure of $\tau$. This measure can be used to modify the receiving system, i.e. put a delay of $\tau$ in all other channels or, if a delay $T$ exists in each channel, to remove a delay of $\tau$ from the appropriate channel.

Because of the change in sense as $\tau$ goes from + to −, a phase detector at baseband using the result of demodulating the combined signal will notify the system to add or subtract delay. Thus, as the signals fade and the direct path is stronger than the indirect path, the time delay $\tau$ can be reinserted.

The drawing shows a block diagram of the multipath compensation system 10 of the present invention. The system 10 includes a plurality of identical channels numbered 1, 2, 3...n, and enclosed in dotted blocks 12. The signals received on each channel 12 is applied to an amplifier 14 whose output is fed to a variable delay 16 having a plurality of taps 18. A switch 20 may be connected to a selected tap 18 in order to provide a desired delay $\tau$. The delayed signal from the delay 16 is fed to a basic synthetic phase isolator predetection combiner which is shown in dotted block 22. The synthetic phase isolator predetection combiner 22 is of the type described in Ser. No. 562,375 and a description of the structural and operational details of the combiner 22 may be found in that application. Briefly, the combiner 22 includes a first mixer 24, a filter 26 and a second mixer 28 connected in series. The input signal is directly applied to both the first and second mixers 24 and 28. A feedback path 30 is provided from the output of the second mixer 28 to the first mixer 24.

The present invention includes the addition of a phase detector and an amplitude detector in order to determine the sense and magnitude of the echos in the incoming signals to permit compensation therefor. This invention is not directed to any particular method of compensation but merely detecting when compensation is required and to determine the magnitude and direction or sense of echo compensation which is necessary. Once this information has been determined the type of compensation may include: (1) turning off the highly contaminated channel; (2) using a delay equalizer to cancel the echo; or (3) decreasing the amplitude of the contaminated signal. The embodiment shown in the drawing utilizes a delay equalizer.

To determine the amplitude of the necessary compensation an amplitude discriminator 32 is connected between the first mixer 24 and the filter 26. The output of the discriminator 32 is connected to a pilot filter 34 which establishes a threshold level. The filtered signal is applied to an amplitude detector 36 whose output is connected to a switching circuit 38. The switching circuit 38 controls the positioning of the switch 20 so that the appropriate delay tap 18 is selected. When the threshold level of the pilot filter 34 is exceeded, the amplitude detector 36 activates the switching circuit 38 to effect a change in the positioning of switch 20 with respect to the taps 18 of delay 16.

In addition to measuring the amplitude of the echos the phase must also be measured to determine whether the echo is early or late with respect to the received signal. The direction or sense of any compensation which must be made is determined by a phase detector 48. Although a separate phase detector circuit must be provided in each channel, a single driving demodulator 40 suffices for all the channels. The phase detector 48 is coupled to the feedback loop 30 via demodulator 40. Loop 30 serves as the feedback loop for all of the channels after the output signals from each of the channels have been combined in a summing circuit 42. The demodulator 40 includes a phase discriminator 44 connected in series with a pilot filter 46. The outputs of pilot filter 46 and pilot filter 34 are applied to phase detector 48. The output of each of the phase detectors 48 is applied to the corresponding switching circuit 38 which provides the necessary information on direction of change to be applied through the delay 16. If one of the delays 16 is at its final position and the switching circuit calls for another step, the situation can be handled by stepping each of the other channels in the opposite direction or sense. It is also possible to provide a continuous system.

The embodiment of the system shown in the drawing includes a delay 16 in each channel. For a receiver configuration that has no delay line, the compensation may be provided by a weighting of the channels. Another approach to effecting the compensation is to equalize the noise plus crosstalk. In this approach, the weighting of the channels is primarily based on input noise with the result of making each channel have equal noise.

Another application of this invention is in the time correction essential to large antenna arrays. For instance, a long-linear array can have an extremely wide information bandwidth in the broadside direction. This same array will have a much narrower information bandwidth in the endfire direction due to transmission times to the elements of the array. If an array has insufficient bandwidth or improper delay compensation for the particular angle of arrival of signal, the combiner process can recognize this and corrective action initiated. Thus, the large array can not only combine prior to detection but can automatically adapt to the angle of arrival. This means correction can be made for RF phase delay and information phase delay by using the synthetic signal phase isolator signal processor as the basic computation device.

We claim:

1. In combination:
means for receiving input information signals of varying relative phase at a plurality of channels;
means in each of said channels including heterodyning, combining and filtering means serially connected to said receiving means for providing output signals containing said information and with the relative phase of the output signals substantially independent of said input signals;
feedback means in each of said channels fed by the sum of said output signals including a regenerative loop including means for multiplying said information containing signals with said input signals;
means coupled to said means for receiving input information signals for detecting the presence of an echo in each of said channels; and
means coupled to said means for detecting the presence of an echo for minimizing any of said detected echoes accompanying said information signals in each of said channels such that a more coherent output signal is provided at the output of each of said channels.

2. A combination in accordance with claim 1 wherein said means coupled to said means for detecting the presence of an echo for minimizing said detected echo includes a variable delay.

3. In combination:
means for receiving input information signals of varying relative phase at a plurality of channels;
means in each of said plurality of channels including heterodyning, combining and filtering means serially connected to said receiving means for providing output signals at the output of each of said channels containing said information and with the relative phase of said output signals substantially independent of said input signals;
feedback means in each of said channels fed by the sum of said output signals including a regenerative positive feedback loop including means for multiplying said information containing signals with said input signals;
means coupled to said receiving means for detecting the phase and amplitude of any echoes accompanying the input information signals in each of said channels; and
means coupled to said detecting means for utilizing the phase and amplitude of any detected echoes for minimizing said echoes to provide a more coherent output signal at each of said channels.

4. In combination:
means for accepting a plurality of input signals of varying phase;
regenerative feedback loops including frequency determining means;
means for progressively multiplying and heterodyning said input signals with loop signals in said regenerative feedback loops to provide signals of the same phase being substantially the same characteristics as said input signals;

means for summing said signals of the same phase to provide linear summed loop signals, said latter signals being coupled to said multiplying means;

means coupled to the output of said multiplying means for detecting the amplitude of any echos accompanying the signal;

means coupled to the output of said summing means for detecting the phase of any echos accompanying the signal; and means coupled to said signal accepting means for utilizing the phase and amplitude of any echos to control the echos to provide a more coherent signal.

5. The combination as set forth in claim 4 wherein:

said amplitude detecting means includes an amplitude discriminator, a pilot filter set at a predetermined threshold level and an amplitude detector connected in series between the output of said multiplying means and said echo controlling means; and said phase detecting means includes a phase discriminator and a pilot filter coupled in series between the output of said summing means and said echo controlling means.

6. The combination as set forth in claim 4 wherein:

said echo controlling means includes a switching circuit coupled between the outputs of said echo phase and amplitude detecting means and the input to said multiplying means and a delay means controlled by said switching circuit for providing the required echo phase and amplitude control over the incoming signal to provide a more coherent output signal.

7. The combination as set forth in claim 4 wherein:

said amplitude detecting means includes an amplitude discriminator, a pilot filter set at a predetermined threshold level and an amplitude detector connected in series between the output of said multiplying means and said echo controlling means;

said phase detecting means includes a phase discriminator and a pilot filter coupled in series between the output of said summing means and said echo controlling means; and said echo controlling means includes a switching circuit coupled between the outputs of said echo phase and amplitude detecting means and the input to said multiplying means and a delay means controlled by said switching circuit for providing the required echo phase and amplitude control over the incoming signal to provide a more coherent output signal.

* * * * *